Patented June 26, 1951

2,557,921

UNITED STATES PATENT OFFICE 2,557,921

STABILIZATION OF EDIBLE FATS AND OILS

Joseph A. Chenicek, Riverside, and William K. T. Gleim, Chicago, Ill., assignors to Universal Oil Products Company, Chicago, Ill., a corporation of Delaware No Drawing. Application January 30, 1948, Serial No. 5,516

14 Claims. (Cl. 99—163)

This invention relates to the stabilization of edible fats and oils and more particularly to the inhibition of the development of rancidity therein.

The edible fats and oils which may be stabilized in accordance with the present invention are generally of animal or vegetable origin. Merely as typical representatives, the following are mentioned; linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats which are sold under various trade names. It is understood that other oils and fats may be treated within the scope of the present invention, including oils and fats which previously have been subjected to various treatments, such as blowing with air, heat treatment, etc.

In accordance with the present invention, the edible fats and oils are stabilized by the addition of a novel inhibitor. Satisfactory inhibitors for edible fats and oils must meet certain strict requirements. In the first place, the inhibitor must be potent in order to sufficiently prevent or retard rancidity development. Extensive investigations have shown that there is no prediction of potency in edible fats and oils based upon prior effectiveness in other organic substances. Conversely, inhibitors which are satisfactory for use in edible fats and oils may not be satisfactory in other organic substances.

Further, satisfactory inhibitors for edible fats and oils must be non-toxic, must not impart bad odor and taste to the fats and oils, and must not be so volatile that they are removed from the fats and oils during cooking or in deep fat frying. In addition, the inhibitor must be readily soluble in edible fats and oils in order to be satisfactorily incorporated therein.

In one embodiment the present invention relates to a method of stabilizing edible fats and oils against rancidity which comprises adding thereto a hexahydroxy-p-terphenyl.

In a specific embodiment the present invention relates to a method of stabilizing lard which comprises adding thereto from about 0.001% to 0.5% by weight of 2,4,2',5',2'',4''-hexahydroxy-p-terphenyl.

The novel inhibitors of the present invention may be represented by the following general structures:

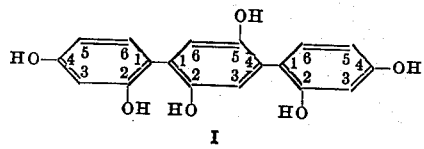

I

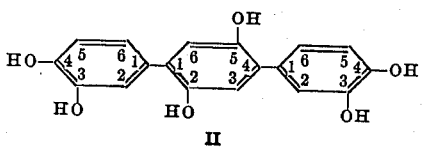

II

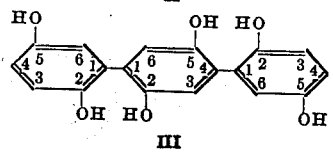

III

Structure I may be named 2,4,2',5',2'',4''-hexahydroxy-p-terphenyl and also may be called diresorcinyl hydroquinone. Structure II may be named 3,4,2',5',3'',4''-hexahydroxy-p-terphenyl and also may be called dicatechol hydroquinone. Structure III may be named 2,2',2'',5,5',5''-hexahydroxy-p-terphenyl.

Although not illustrated in the above general structure in the interest of simplicity, the novel inhibitors of the present invention include compounds of the general structures hereinbefore illustrated in which 1, 2 or 3 of the phenyl rings contain alkyl substituent groups. While the alkyl groups may contain from 1 to about 10 carbon atoms and include such groups as methyl, ethyl, propyl, butyl, amyl, hexyl, heptyl, octyl, nonyl and decyl, the alkyl groups preferably contain from 1 to 4 carbon atoms and include such groups as ethyl, methyl, propyl, and butyl. This is particularly true when more than 1 of the rings are substituted with alkyl groups, in order that the total number of carbon atoms does not exceed about 30.

The novel inhibitor of the present invention may be prepared in any suitable manner. For example, in the preparation of 2,4,2',5',2'',4''-hexahydroxy-p-terphenyl, benzoquinone is reacted with an excess of resorcinol in the presence of an acid catalyst such as sulfuric acid. The resultant diresorcinyl quinhydrone is reduced to the desired compound by boiling in a suitable reagent such as glacial acetic acid. Usually it is desired to treat the product with a suitable decolorizing agent such as stannous chloride to produce a colorless product.

When inhibitors containing alkyl substituent groups are desired, alkylation of the hexahydroxy-p-terphenyl compound may be effected in any suitable manner. For example, butylation may be effected by mixing the hexahydroxyterphenyl compound with tertiary butyl alcohol and adding a suitable catalyst, such as 85% phosphoric acid. The mixture is heated for a sufficient time to effect the desired alkylation and thereafter is cooled and the acid layer is separated from solid material. The solid material is recovered by filtration and then is water washed. Depending upon the quantity of tertiary butyl alcohol employed and the time of reaction, the product will be mono or polybutylated. For polybutylation, a larger quantity of tertiary butyl alcohol and a long time of reaction are necessary.

The inhibitor of the present invention is added to fats and oils in an amount of less than 1% by weight and generally within the range of from about 0.001% to about 0.5%. It is understood that the inhibitor may be used in conjunction with a synergist, such as phosphoric acid, ascorbic acid, etc.

The following examples are introduced to illustrate further the novelty and utility of the present invention but not with the intention of unduly limiting the same.

The following tests were made with a lard which had a normal stability period of 3½ hours as determined by the Swift test. This test is described in detail in the article by A. E. King, H. L. Roschen, and W. H. Irwon, which appeared in the Oil and Soap, vol. X, No. 6, pages 105 to 109 (1933). In general, this test comprises bubbling air through a sample of the lard and reporting the number of hours until the lard develops a peroxide value of 20.

*Example I*

2,4,2',5',2'',4''-hexahydroxy-p-terphenyl was prepared as follows: 10.8 grams of benzoquinone (0.1 mol) were suspended in 500 cc. of 1% sulfuric acid, and a solution of 55 grams of resorcinol (0.5 mol) was slowly added thereto. The reaction mixture turned red and a dark precipitate was recovered by filtration. The precipitate is diresorcinyl quinhydrone, and this was reduced by dissolving in boiling glacial acetic acid. While still wet, enough stannous was added to decolorize the solution. After cooling, a colorless precipitate was recovered by filtration. The product had a melting point of 193–195.

The above inhibitor was added in a concentration of 0.02% by weight to the lard as heretofore described, and increased the induction period thereof from 3½ hours to 168 hours.

*Example II*

Another sample of the inhibitor used in Example I was butylated by dissolving 1 gram thereof in 10 grams of tertiary butyl alcohol, and then adding 20 grams of 85% phosphoric acid. The mixture was heated for 3 hours on a steam bath. After cooling a solid precipitate appeared on top of an acid layer. The precipitate was filtered and washed with water. The exact composition of the product is not known but it is believed to contain two tertiary butyl groups attached to the phenyl rings.

When tested in another sample of the lard described in Example I, this inhibitor increased the induction period from 3½ hours to about 150 hours.

We claim as our invention:

1. A method of stabilizing edible fats and oils against rancidity which comprises adding thereto a hexahydroxy-p-terphenyl having two hydroxy radicals on each of the phenyl rings.

2. A method of stabilizing lard which comprises adding thereto from about 0.001% to about 0.5% by weight of a 2,4,2',5',2'',4''-hexahydroxy-p-terphenyl.

3. A method of stabilizing lard which comprises adding thereto from about 0.001% to about 0.5% by weight of a 3,4,2',5',3'',4''-hexahydroxy-p-terphenyl.

4. A method of stabilizing lard which comprises adding thereto from about 0.001% to about 0.5% by weight of a 2,2',2'',5,5',5''-hexahydroxy-p-terphenyl.

5. The process of claim 1 further characterized in that said hexahydroxy-p-terphenyl contains at least 1 alkyl group attached to at least one of the phenyl rings.

6. Edible fats and oils normally tending to become rancid containing a hexahydroxy-p-terphenyl having two hydroxy radicals on each of the phenyl rings in an amount sufficient to retard rancidity development.

7. Edible fats and oils normally tending to become rancid containing less than about 1% by weight of a 2,4,2',5',2'',4''-hexahydroxy-p-terphenyl.

8. Edible fats and oils normally tending to become rancid containing less than about 1% by weight of a 3,4,2',5',3'',4''-hexahydroxy-p-terphenyl.

9. Edible fats and oils normally tending to become rancid containing less than about 1% by weight of a 2,2',2'',5,5',5''-hexahydroxy-p-terphenyl.

10. Lard normally tending to become rancid containing from about 0.001% to about 0.5% by weight of 2,4,2',5',2'',4''-hexahydroxy-p-terphenyl.

11. Lard normally tending to become rancid containing from about 0.001% to about 0.5% by weight of 3,4,2',5',3'',4''-hexahydroxy-p-terphenyl.

12. Lard normally tending to become rancid containing from about 0.001% to about 0.5% by weight of 2,2',2'',5,5',5''-hexahydroxy-p-terphenyl.

13. The composition of claim 6 further characterized in that said hexahydroxy-p-terphenyl contains at least 1 alkyl group attached to at least one of the phenyl rings.

14. The composition of claim 13 further characterized in that said alkyl group comprises a butyl group.

JOSEPH A. CHENICEK.
WILLIAM K. T. GLEIM.

REFERENCES CITED

The following references are of record in the file of this patent:

UNITED STATES PATENTS

| Number | Name | Date |
|---|---|---|
| 1,913,367 | Calcott | June 13, 1933 |
| 1,993,771 | Calcott et al. | Mar. 12, 1935 |
| 2,267,155 | Jenkins | Dec. 23, 1941 |